United States Patent [19]
Baltzer et al.

[11] Patent Number: 5,944,197
[45] Date of Patent: Aug. 31, 1999

[54] RECTANGULAR OPENING WOVEN SCREEN MESH FOR FILTERING SOLID PARTICLES

[75] Inventors: Terry L. Baltzer; Robert E. Norman, both of Tulsa, Okla.

[73] Assignee: Southwestern Wire Cloth, Inc., Tulsa, Okla.

[21] Appl. No.: 08/847,408

[22] Filed: Apr. 24, 1997

[51] Int. Cl.[6] .................................................... B07B 1/49
[52] U.S. Cl. ......................................... 209/400; 209/401
[58] Field of Search .................................. 209/391, 392, 209/400, 401–403

[56] References Cited

U.S. PATENT DOCUMENTS

| | | |
|---|---|---|
| 45,796 | 1/1865 | Ogborn . |
| 142,276 | 8/1873 | Richardson . |
| 455,845 | 7/1891 | Hain . |

(List continued on next page.)

FOREIGN PATENT DOCUMENTS

| | | | |
|---|---|---|---|
| 725463 | 1/1966 | Canada . | |
| 2407026 | 2/1978 | France . | |
| 75/2229 | 3/1976 | South Africa . | |
| 1512958 | 6/1978 | United Kingdom ........... | B01D 27/06 |
| 1526663 | 9/1978 | United Kingdom ............. | B07B 1/46 |
| 1575312 | 9/1980 | United Kingdom ............. | B07B 1/28 |
| 1578948 | 11/1980 | United Kingdom . | |
| 2162091 | 1/1986 | United Kingdom ............. | B07B 1/50 |
| 2276572 | 10/1994 | United Kingdom ............. | B07B 1/54 |
| PCT/US94/ 00242 | 1/1994 | WIPO ............................. | B07B 1/28 |
| PCT/US94/ 23849 | 10/1994 | WIPO . | |

OTHER PUBLICATIONS

"Pyramid Shaker Screens Help1 Reduce Oil Mud Losses"; Oil & Gas Journal, Jul. 17, 1995, Author Dietmar Neidhart, pp. 62–63.

American Petroleum Institute, API Recommended Practice, BE (RPI3E), Third Edition, May 1, 1993.

*Primary Examiner*—David H. Bollinger
*Attorney, Agent, or Firm*—Head, Johnson & Kachigian

[57] ABSTRACT

A woven wire screen cloth having a plurality of parallel warp filaments intersected by a plurality of parallel shute filaments configured to enhance both conductance and screen life. A greater number of warp filaments are provided than shute filaments per given area. A plurality of rectangular openings are formed from the warp and shute filaments with each rectangular opening having a length and width. The length to width ratio of the rectangular openings is between approximately 2.7 to 2.8. The length of the rectangular openings to the diameter of the shute filaments is a ratio of between approximately 5.5 to 5.7. The screen cloth is calendared to assist in locking the intersections of the warp and shute filaments in place.

11 Claims, 3 Drawing Sheets

U.S. PATENT DOCUMENTS

| | | |
|---|---|---|
| 516,673 | 3/1894 | Wilson . |
| 597,245 | 1/1898 | Phillips . |
| 1,009,069 | 11/1911 | Hunnicutt . |
| 1,026,265 | 5/1912 | Hunnicutt . |
| 1,027,734 | 5/1912 | Hunnicutt . |
| 1,132,667 | 3/1915 | Milliot . |
| 1,147,279 | 7/1915 | Sweetland . |
| 1,420,685 | 6/1922 | Burch . |
| 1,594,400 | 8/1926 | Wuest . |
| 1,713,143 | 5/1929 | Overstrom . |
| 1,716,758 | 6/1929 | Bland . |
| 1,718,385 | 6/1929 | Sherwood . |
| 1,861,663 | 7/1932 | Lahey . |
| 1,886,173 | 11/1932 | Flint . |
| 2,008,560 | 7/1935 | Nutting . |
| 2,011,365 | 8/1935 | Kuballe ................ 209/394 |
| 2,052,467 | 8/1936 | Hermann .............. 209/401 |
| 2,061,850 | 11/1936 | Roberts ................ 210/76 |
| 2,088,313 | 7/1937 | Wettlaufer . |
| 2,181,605 | 11/1939 | Norvell . |
| 2,190,993 | 2/1940 | Muir . |
| 2,197,805 | 4/1940 | Lovett . |
| 2,247,040 | 6/1941 | Whitsett . |
| 2,271,662 | 2/1942 | Rubissow . |
| 2,271,900 | 2/1942 | Mowbray ............. 209/403 |
| 2,311,813 | 2/1943 | Beck et al. ............ 92/32 |
| 2,315,055 | 3/1943 | Heller . |
| 2,341,414 | 2/1944 | Polivka . |
| 2,425,235 | 8/1947 | Ferrante . |
| 2,511,239 | 6/1950 | Behnke et al. . |
| 2,723,032 | 11/1955 | Gisler et al. .......... 209/401 |
| 2,746,607 | 5/1956 | Hess . |
| 2,813,629 | 11/1957 | Brugmann . |
| 2,827,169 | 3/1958 | Cusi ..................... 209/397 |
| 2,834,472 | 3/1958 | Lynford . |
| 2,864,500 | 12/1958 | Miller . |
| 2,870,910 | 1/1959 | Wehner . |
| 2,902,165 | 9/1959 | Imershein . |
| 2,959,285 | 11/1960 | Tonjes et al. . |
| 2,985,303 | 5/1961 | Wright ................. 209/405 |
| 3,012,674 | 12/1961 | Hoppe . |
| 3,255,885 | 6/1966 | Burls .................... 209/314 |
| 3,374,888 | 3/1968 | Volpert et al. . |
| 3,483,976 | 12/1969 | Williams . |
| 3,508,649 | 4/1970 | Kahane et al. . |
| 3,666,277 | 5/1972 | Hubach et al. . |
| 3,684,091 | 8/1972 | Wehner ................ 209/403 |
| 3,718,963 | 3/1973 | Hawkins et al. . |
| 3,747,770 | 7/1973 | Zentis . |
| 3,812,972 | 5/1974 | Rosenblum . |
| 3,833,120 | 9/1974 | Ogata . |
| 3,900,628 | 8/1975 | Stewart ................ 428/134 |
| 3,970,550 | 7/1976 | Fry et al. . |
| 4,033,865 | 7/1977 | Derrick, Jr. ........... 209/275 |
| 4,040,951 | 8/1977 | Cole ..................... 209/408 |
| 4,042,511 | 8/1977 | Ginaven . |
| 4,120,785 | 10/1978 | Kanamori et al. . |
| 4,126,560 | 11/1978 | Marcus et al. . |
| 4,222,865 | 9/1980 | Valeri et al. . |
| 4,380,494 | 4/1983 | Wilson ................. 209/319 |
| 4,390,420 | 6/1983 | Tenhaaf . |
| 4,420,391 | 12/1983 | Sharki .................. 209/403 |
| 4,457,839 | 7/1984 | Bailey .................. 209/234 |
| 4,563,270 | 1/1986 | Wolff . |
| 4,575,421 | 3/1986 | Derrick et al. ........ 209/397 |
| 4,617,122 | 10/1986 | Kruse et al. .......... 210/493 |
| 4,668,394 | 5/1987 | Badolato et al. . |
| 4,728,422 | 3/1988 | Bailey . |
| 4,746,339 | 5/1988 | Millard ................. 55/302 |
| 4,758,333 | 7/1988 | Masica et al. ........ 209/397 |
| 4,805,656 | 2/1989 | Cole et al. . |
| 4,860,467 | 8/1989 | Larson . |
| 5,137,622 | 8/1992 | Souter . |
| 5,139,154 | 8/1992 | Gero et al. ............ 209/273 |
| 5,221,008 | 6/1993 | Derrick et al. ........ 209/269 |
| 5,256,291 | 10/1993 | Cagle . |
| 5,256,292 | 10/1993 | Cagle ................... 210/499 |
| 5,385,669 | 1/1995 | Leone, Sr. ............ 210/488 |
| 5,417,793 | 5/1995 | Bakula .................. 156/308 |
| 5,417,858 | 5/1995 | Derrick et al. ........ 210/388 |
| 5,417,859 | 5/1995 | Bakula .................. 210/388 |

RECTANGULAR OPENING WOVEN SCREEN MESH FOR FILTERING SOLID PARTICLES

BACKGROUND OF THE INVENTION

1. Field of the Invention

The present invention is directed to a woven wire screen cloth having rectangular openings for filtering solid particles. In particular, the present invention is directed to a woven wire screen cloth having rectangular openings which will maximize conductance and maximize screen life.

2. Prior Art

In the drilling of subterranean wells, it is often times standard practice to insert a fluid such as an oil well drilling fluid or "drilling mud" which is used to reduce friction in the drilling and which also is used as a carrier fluid. A drilling fluid, which may be aqueous-based or oil based, is inserted into the well during the drilling operation. This may be done through a drilling string of tubing or in another manner. The drilling mud is introduced to the lower most section of the tubing near the drill bit. The drilling mud circulates upward and carries with it cuttings and other particulate material resulting from penetration of the bit through the earth.

It is preferable and desirable to reuse or recycle this drilling mud. This is done by separating the solid particulate matter in the drilling mud from the base fluid. This is accomplished at the surface by using one or more solid separating devices such as vibrating screen machines or "shale shakers" to separate solids from fluids. The vibrating screen machine vibrates a screen or screen panels in a continuous or in varying patterns such that solids larger than the screen mesh openings will not pass through the openings. The solid particulate matter above a "cut point" is thereby separated from the drilling fluid. The continuous vibration, however, combined with the solids striking the screen, tends to reduce the screen usable life.

Various types of screens or perforated plates have been employed in the past although screens composed of woven wire have proven both effective and cost efficient. In woven wire screens, warp wires run lengthwise during the weaving process and are crossed at right angles by the shute wires. The woven wires intersect and form openings in the cloth. The mesh count is the number of openings per linear inch of screen. It is known that making the openings rectangular or oblong will increase the conductance. The average length to width ratio of the screen openings is called the aspect ratio.

Increasing the length of the openings beyond a certain point will result in decreased efficiency since the wires will tend to move in directions perpendicular to the length. Various efforts have been addressed to this problem. For example, see Hermann, U.S. Pat. No. 2,052,467, wherein the shute wires are eliminated and the warp wires tensioned in effort to avoid movement.

Another proposal directed to this problem is seen in Cagle, U.S. Pat. No. 5,256,291, wherein the shute wires are double woven.

Other proposals directed to this problem include coating the woven cloth with a bonding agent, which tends to lock the intersections in place.

The screen panels in the vibratory screen machines are often times replaceable and may be of a single woven wire screen layer or of multiple screen layers. In a frequently used procedure, a three layer screen assembly is utilized, consisting of two fine mesh layers and a coarser supporting layer. Further support in the nature of a perforated metal plate may also be employed.

The multiple layer screen assembly serves a number of purposes. The multiple layers serve as support for the finest screen layer. Additionally, the multiple layers address the possibility of blinding, which is the tendency of solid material being screened to clog in the openings of the screen cloth or screen cloths. During the vibratory process, the two fine screen layers will strike against each other, tending to unclog the clogged openings.

The separation performance of a screen assembly is represented by its separation performance, its conductance or liquid through-put performance and its service life or durability. The separation performance of a screen assembly, the percent of solids removed as a function of particle size, is often measured. The liquid through-put capacity is primarily a function of screen conductance and its usable area. Conductance is a measure of the ease with which fluid can flow throughout the screen per unit area. Conductance is calculated from the mesh count of the wires and the wire diameters of the screen cloth according to a known formula (see API Recommended Practice 13E, Third Edition, 1993). Conductance, C, measured in kilodarcies/millimeter is computed by the formula $$C = \frac{4095 \times E^2}{A^2 \times t}$$

Where "E" is the void fraction of the screen, "A" is the wire surface area to mesh volume ratio and "t" is the screen thickness. "E" is given by a formula $$E = \frac{\left(\frac{1}{N_s} \times \frac{1}{N_w}\right) + (V_w + V_s)}{\left(\frac{1}{N_s} \times \frac{1}{N_w}\right) \times t}$$

Where $N_s$ and $N_w$ are shute and warp mesh counts and $V_s$ and $V_w$ are the wire volumes in cubic inches.

The wire surface area to volume ration, A, is given by the formula $$A = \frac{\pi d_w l_w + \pi d_s l_s}{\left(\frac{t}{N_s N_w}\right)}$$

Based on these formulas, it is possible to calculate the conductance through the screen.

For multi-layer screens, the inverse of conductance for each screen layer is summed to equal the inverse of the net overall conductance as follows:

$$\frac{1}{C^t} = \frac{1}{C_1} + \frac{1}{C_2} + \frac{1}{C_n}$$

It is known that increasing the wire diameter size of the filaments will increase the service life of the screen. At the same time, increase of the wire diameters will decrease the conductance through the screen.

It will be recognized that service life will also be influenced by other factors such as the rate of loading on the screens and the abrasiveness of the cuttings.

Also, in the past, it has been known to calendar screens by placing the screen layer through opposed rollers although, heretofore, this has been done on larger diameter screens to flatten out the knuckles at the intersections.

It is, therefore, a goal of the present invention to balance enhanced screen life while maximizing the conductance of the screen at a reasonable cost of manufacture.

Accordingly, it is a principal object and purpose of the present invention to provide a screen with rectangular mesh openings that will maximize conductance or liquid through-put as well as enhance the screen life of the screen assembly.

It is a further object and purpose of the present invention to optimize the wire diameters while maximizing conductance or liquid through-put as well as enhance the screen life of the screen assembly.

It is a further object and purpose of the present invention to calender the screen cloth to assist in locking the intersections of the warp and shute filaments in place.

SUMMARY OF THE INVENTION

The present invention is directed to a woven wire mesh screen. The screen includes a plurality of parallel warp filaments which are crossed by and interwoven with a plurality of parallel shute filaments in order to form a plurality of intersections. There are a greater number of warp filaments than shute filaments per unit or given area. The plurality of intersections form rectangular openings having both the length dimension l and a width dimension w.

The length of the rectangular opening, l, to the width of the rectangular openings, w, may be expressed as a ratio. The length to width aspect ratio which has been found to be optimal for each opening is between approximately 2.7 to 2.8.

It has also been determined that the length of each rectangular opening to the diameter of the shute filaments may be expressed as a ratio. The optimal ratio of the length of each opening to the diameter of the filaments is a ratio of between approximately 5.5 to 5.7.

Finally, it has been found that calendering the wire mesh screen cloth with the optimal ratios between a set of rollers compresses the cloth at the shute and warp intersections and assists to resist movement between the warp and shute filaments.

The combination of the optimal wire diameter ratio and calendering together permit an increased length to width ratio.

The teachings of the present invention may be employed with a single layer of screen cloth or with a multi-layer screen assembly such as three screen cloths and a perforated support plate.

DETAILED DESCRIPTION OF THE PREFERRED EMBODIMENTS

Figure 1:
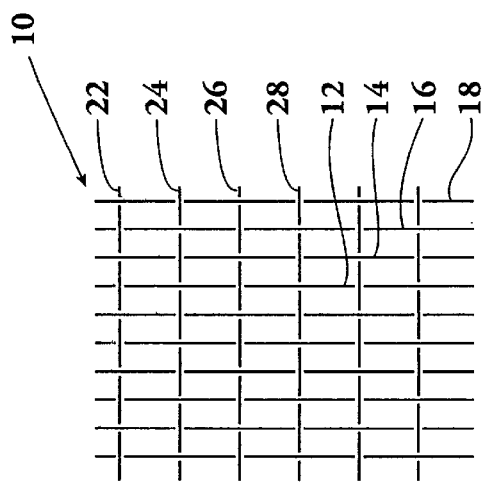
FIG. 1 is a top view of a portion of a woven screen mesh constructed in accordance with the present invention.
Figure 2:
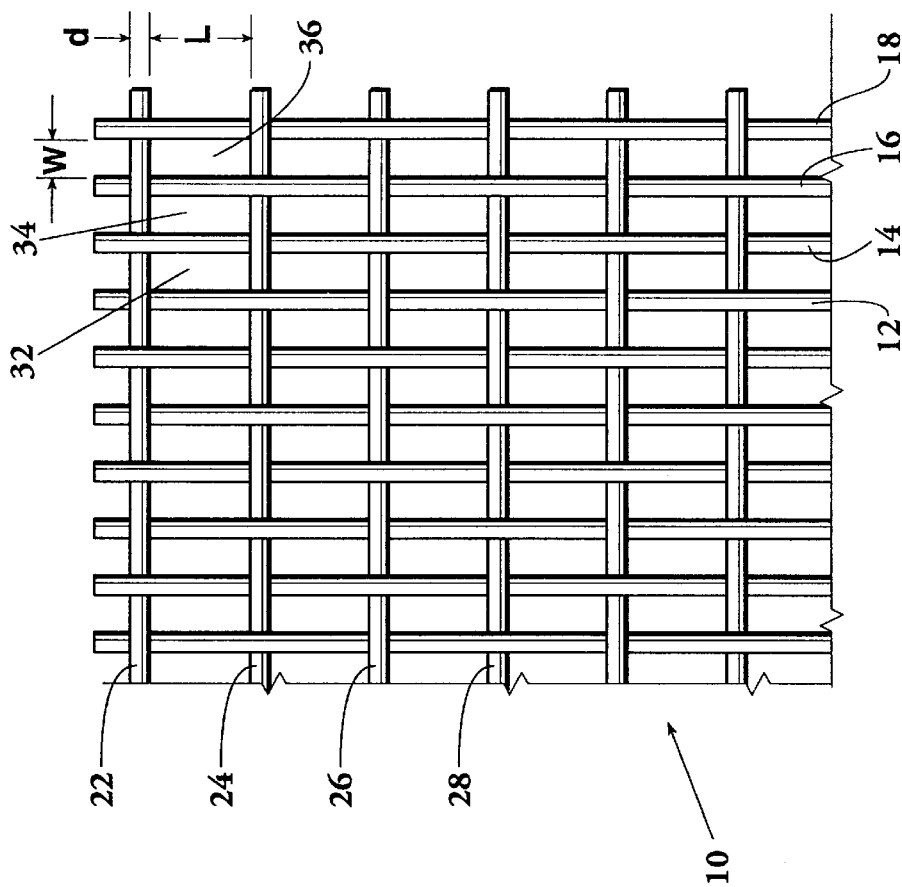
FIG. 2 is an enlarged view of a portion of the screen shown in FIG. 1.

Referring to the drawings in detail, FIG. 1 is a top view of a portion of woven wire mesh screen 10 constructed in accordance with the present invention. FIG. 2 illustrates an enlarged view of the screen 10 shown in FIG. 1. The screen 10 includes a plurality of parallel warp filaments, such as at 12, 14, 16 and 18, which are crossed by and interwoven with a plurality of parallel shute filaments, such as at 22, 24, 26 and 28, at their intersections.

It can be seen that there are a greater number of warp filaments 12, 14, 16 and 18 than shute filaments 22, 24, 26 and 28 per unit or given area. The woven warp and shute filaments form a plurality of intersections which, in turn, form rectangular openings, such as openings 32, 34 and 36. The rectangular openings have both a length dimension L and a width dimension W.

By increasing the length of the rectangular openings 32, 34 and 36, a greater open area is obtained than with square openings. At the same time, the screen warp filaments 12, 14, 16 and 18 effectively block or screen solid particles having a diameter larger than the space between the warp filaments 12, 14, 16 and 18.

Figure 3:
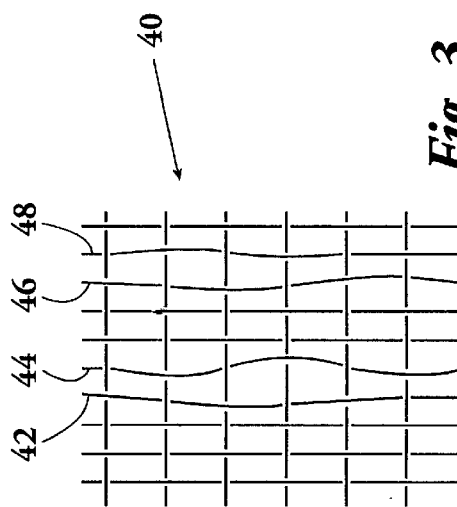
FIG. 3 is a portion of a prior art screen illustrating a problem to which the present invention is directed.

FIG. 3 illustrates a negative consequence of simply increasing the rectangular opening length versus the opening width. The screen 40 shows openings with a greater length than width. The spacing between the warp filaments 42, 44, 46 and 48 may become distorted because of the removal of shute filaments. Because of this, the warp filaments 42, 44, 46 and 48 may shift their position in relation to the shute filaments. This results in some of the openings having smaller than scheduled widths while others have greater than expected widths. The screen does not, therefor, hold its opening shapes very well. This, the desire for increased conductance can have a negative impact on the quality of the screen and its effectiveness.

A further related problem (not shown) occurs when the warp and shute filaments do not remain perpendicular. This makes the screen more difficult to work with, particularly when assembling in a multi-layer screen assembly with supporting structure.

Also, in the past, in order to maximize conductance, minimum wire diameters have been chosen.

Using heavier wires with greater tensile strength or adding supporting layers of screen cloth will increase screen life but also reduce the conductance.

The length of the rectangular openings L to the width of the rectangular openings W may be expressed as a ratio. The length to width ratio which is optimal for each opening has been found to be between approximately 2.7 to 2.8.

Figure 4:
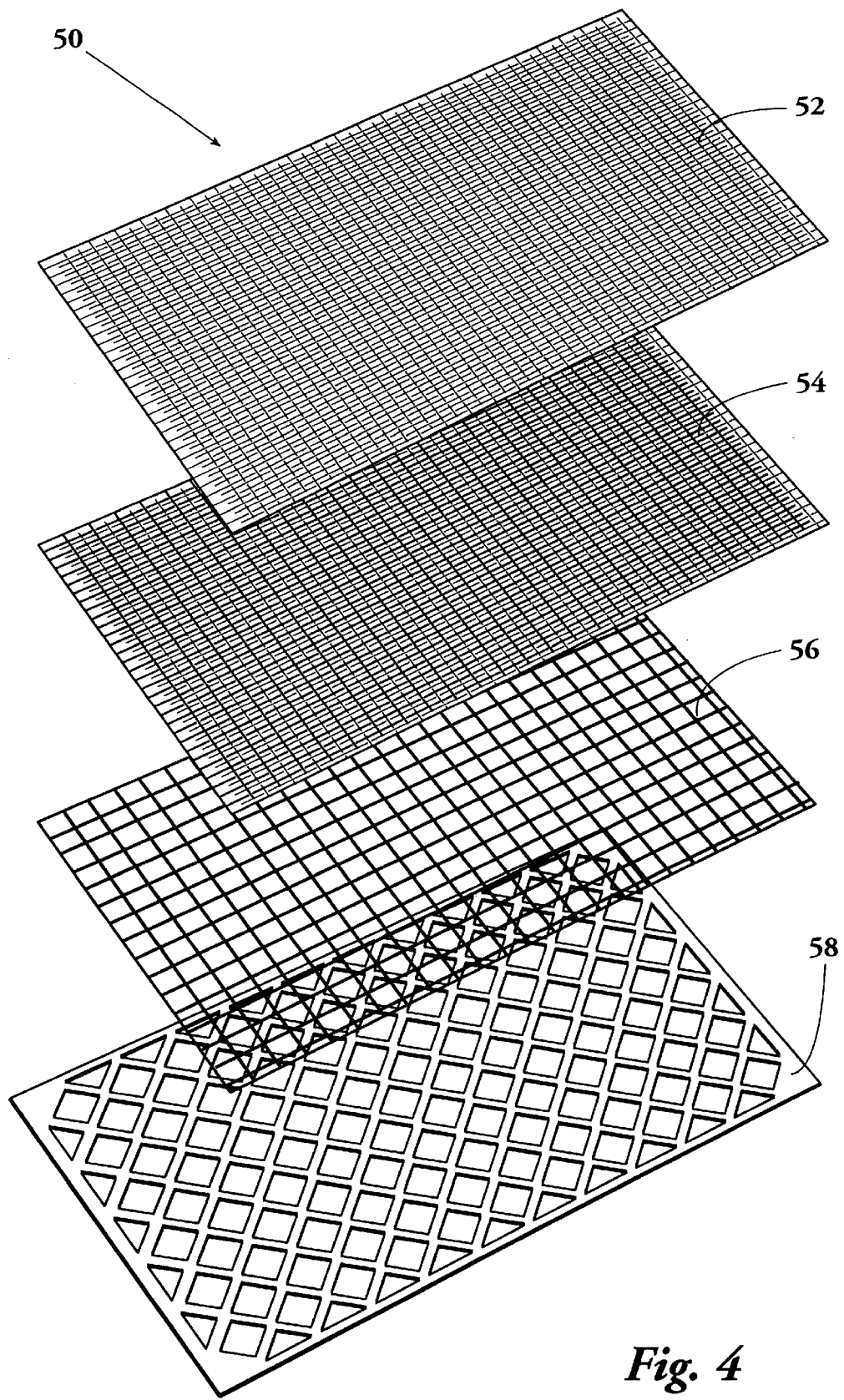
FIG. 4 is an exploded view of a multi-layer screen assembly constructed in accordance with the present invention.

In one embodiment, a screen assembly is provided which includes three layers of screen cloth along with a support plate. As best seen in FIG. 4, a screen assembly 50 is shown in exploded fashion for clarity. The screen assembly 50 includes an uppermost or top screen 52 which has the smallest or finest openings. Beneath the finest screen 52 is a second screen layer 54 which will be parallel to the fine screen 52 and will be of similar size openings or slightly larger openings than the screen 54. Beneath the second screen layer is a support screen 56. Finally, beneath the support screen is a perforated metal plate 58. The screens are bonded to the perforated metal plate.

The layers may be flat or configured in a continuous corrugated or other pattern.

Finally, a further part of the present invention is calendering the top or uppermost screen cloth between a set of rollers. Calendering the screen cloth compresses the cloth at the shute and warp intersections. This serves to discourage movement between the warp and shute filaments and assist in locking the intersections of the warp and shute filaments in place.

Figure 5:
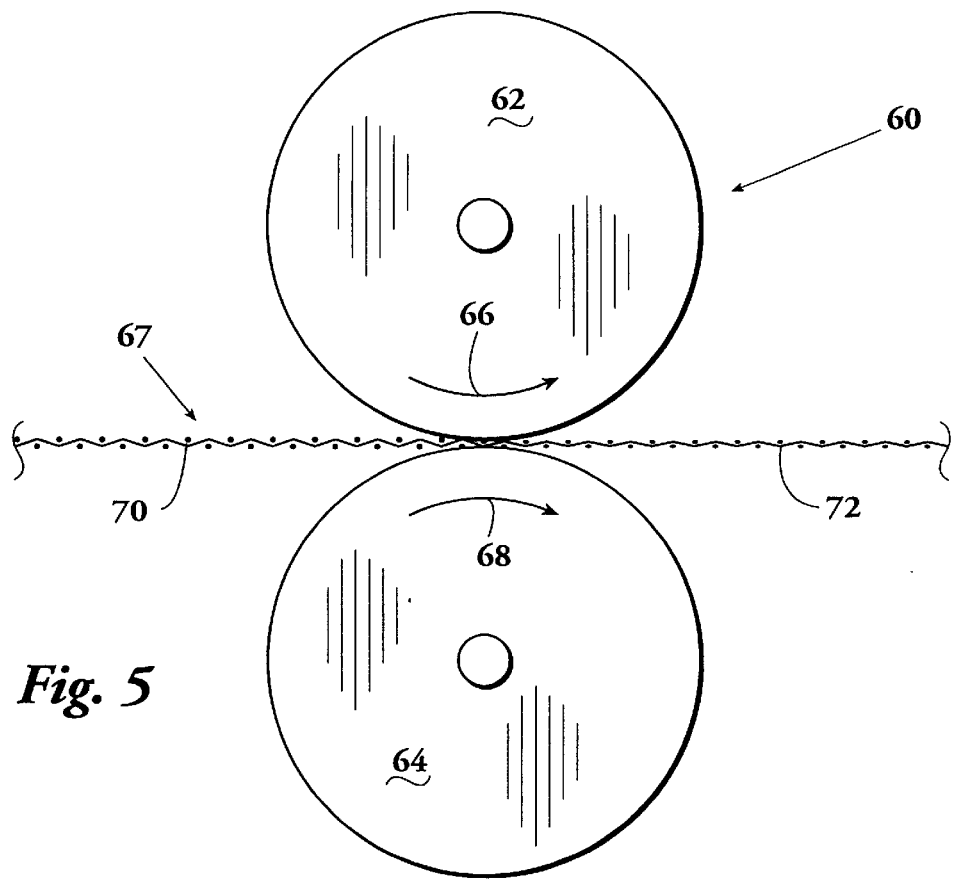
FIG. 5 illustrates calendering of a screen cloth in accordance with the present invention.

FIG. 5 is a side view of a roller mechanism 60 used to calender a wire screen cloth 67. A pair of opposed rollers 62 and 64 rotates in the direction shown by arrows 66 and 68, respectively. The screen cloth 67 is seen before entering the roller at 70 and after exiting the rollers 72. The force of the rollers 70 and 72 compresses the intersections, which have the greatest thickness.

Figure 6:
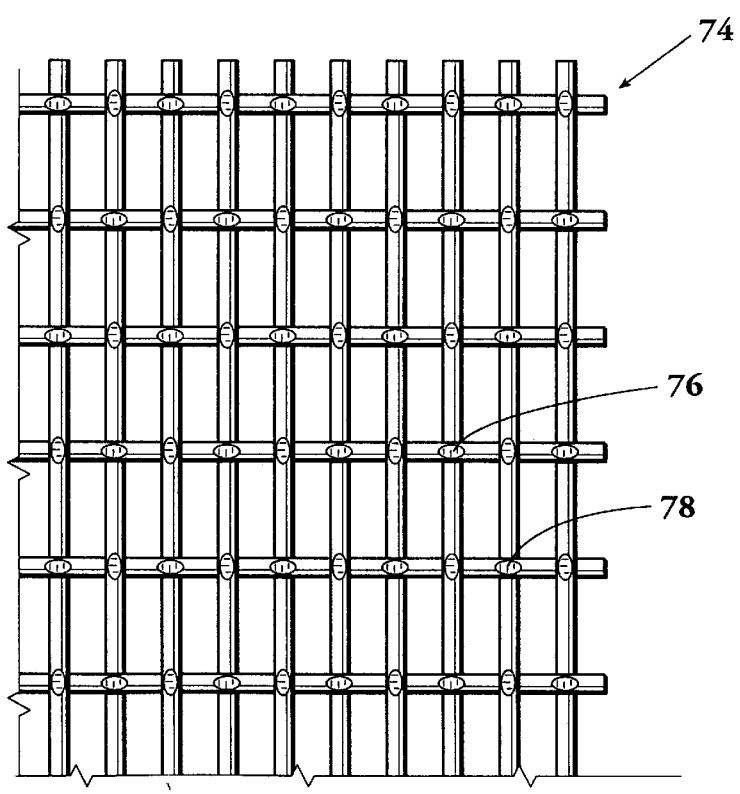
FIG. 6 illustrates a top view of a woven screen mesh following the calendering procedure.

FIG. 6 shows a top view of a screen cloth 74 after completion of the calendering process. The intersections, or knuckles, such as 76 and 78 are flattened by the rollers. Additionally, where the shute and warp filaments intersect and touch each other, the filaments indent or conform slightly to each other.

The conductance of such a three layer screen assembly may be compared with both square opening screens and existing rectangular opening screens. Table 1 illustrates a comparison of three (3) equivalent type screen assemblies. The equivalent designation (such as 210 equivalents) refers to how a three layer screen equates a single layer screen. Table 1 shows a comparison of three layer screens of existing rectangular mesh openings, square openings and the rectangular mesh of the present invention. As observed, the overall conductance (the combination of the three layers) is improved by utilization of the teachings of the present invention.

Each of the screen assemblies in Table 1 would have three (3) layers of screen formed in a corrugated pattern. The screens are typically bonded to support structure.

TABLE 1

| Openings | Shute Mesh | Warp Mesh | Shute Dia | Warp Dia | Conductance |
|---|---|---|---|---|---|
| 210 EQUIVALENTS | | | | | |
| Rectangular | 240 | 150 | 0.0012 | 0.0012 | 2.85 |
| | 105 | 64 | 0.0025 | 0.0025 | 7.70 |
| | 12 | 12 | 0.0180 | 0.0180 | 52.23 |
| | | | OVERALL COND= | | 2.00 |
| Square | 180 | 180 | 0.0012 | 0.0012 | 3.48 |
| | 160 | 160 | 0.0014 | 0.0014 | 3.70 |
| | 12 | 12 | 0.0180 | 0.0180 | 52.23 |
| | | | OVERALL COND= | | 1.74 |
| Applicants | 180 | 85 | 0.0018 | 0.0018 | 4.09 |
| | 120 | 76 | 0.0022 | 0.0022 | 6.43 |
| | 12 | 12 | 0.0180 | 0.0180 | 52.23 |
| | | | OVERALL COND= | | 2.38 |
| 175 EQUIVALENTS | | | | | |
| Rectangular | 205 | 125 | 0.0014 | 0.0014 | 3.44 |
| | 90 | 50 | 0.0030 | 0.0030 | 9.38 |
| | 12 | 12 | 0.0180 | 0.0180 | 52.23 |
| | | | OVERALL COND= | | 2.40 |
| Square | 160 | 160 | 0.0014 | 0.0014 | 3.70 |
| | 130 | 130 | 0.0017 | 0.0017 | 4.65 |
| | 12 | 12 | 0.0180 | 0.0180 | 52.23 |
| | | | OVERALL COND= | | 1.98 |
| Applicants | 165 | 75 | 0.0020 | 0.0020 | 4.47 |
| | 105 | 64 | 0.0025 | 0.0025 | 7.70 |
| | 12 | 12 | 0.0180 | 0.0180 | 52.23 |
| | | | OVERALL COND= | | 2.68 |
| 140 EQUIVALENTS | | | | | |
| Rectangular | 170 | 105 | 0.0017 | 0.0017 | 4.05 |
| | 76 | 45 | 0.0034 | 0.0034 | 11.19 |
| | 12 | 12 | 0.0180 | 0.0180 | 52.23 |
| | | | OVERALL COND= | | 2.81 |
| Square | 130 | 130 | 0.0017 | 0.0017 | 4.65 |
| | 100 | 100 | 0.0023 | 0.0023 | 5.69 |
| | 12 | 12 | 0.0180 | 0.0180 | 52.23 |
| | | | OVERALL COND= | | 2.44 |
| Applicants | 130 | 60 | 0.0025 | 0.0025 | 5.74 |
| | 90 | 50 | 0.0030 | 0.0030 | 9.38 |

TABLE 1-continued

| Openings | Shute Mesh | Warp Mesh | Shute Dia | Warp Dia | Conductance |
|---|---|---|---|---|---|
| | 12 | 12 | 0.018 | 0.018 | 52.23 |
| | | | OVERALL COND= | | 3.33 |

It is possible that the diameters of shute and warp filaments may be different, although in the above examples in Table 1, they are the same.

It has also been determined that the length of each opening to the diameter of the shute filaments may be expressed as a ratio. The optimal ratio of the length of each opening to the diameter of the filaments is a ratio of between approximately 5.5 to 5.7.

FIG. 1 illustrates the relationship of the length of the openings L to the diameter of the shute filaments d. The relationship may be expressed as follows:

$$L/d = 5.5 - 5.7$$

Where "L" is the length of the opening and "d" is the diameter of the shute filaments. The length of the opening, "L", is the actual opening and not the center of the shute to center of the shute dimension.

As can be seen from the foregoing Table 1, the overall conductance is greater than square opening assemblies and is 10–20% higher utilizing the teachings of the present invention than equivalent rectangular opening screens.

It will be understood that the present invention may also be utilized with a single layer of screen cloth employing the teachings of the invention.

As a further option, a single layer of pretensioned screen cloth may be utilized with a backing layer.

Whereas, the present invention has been described in relation to the drawings attached hereto, it should be understood that other and further modifications, apart from those shown or suggested herein, may be made within the spirit and scope of this invention.

What is claimed is:

1. A woven wire screen cloth having a plurality of parallel warp filaments crossed by a plurality of parallel shute filaments in order to maximize conductance and screen life, which screen cloth comprises:

a greater number of said warp filaments than said shute filaments per given area;

a plurality of rectangular openings formed from said filaments, each said rectangular opening having a length and a width, wherein the length to width ratio of each said opening is between approximately 2.7 to 2.8; and wherein the length of each said rectangular opening to the diameter of the shute filaments is a ratio of between approximately 5.5 to 5.7; and wherein said screen cloth is calendered to assist in locking said warp filaments with respect to said shute filaments.

2. A woven wire screen as set forth in claim 1 wherein a plurality of screen cloths are placed one over the other.

3. A woven wire screen cloth as set forth in claim 2 wherein said plurality of screen cloths are configured in a continuous corrugated pattern.

4. A woven wire screen as set forth in claim 2 including three said screen cloths, an upper, middle and lower layer.

5. A woven wire screen as set forth in claim 2 including a frame wherein said screen cloths are affixed to said frame.

6. A woven wire screen as set forth in claim 1 including a series of parallel strips to support the woven wires.

7. A woven wire screen as set forth in claim 1 including a plastic grid to support the woven wires.

8. A woven wire screen as set forth in claim 1 including a perforated metal plate to support the woven wires.

9. A process to produce a screen assembly to maximize conductance and screen life, which process comprises:

providing a woven wire screen cloth having a greater number of parallel warp filaments than parallel shute filaments per given area so that a plurality of rectangular openings are formed;

making the length to width ratio between 2.7 to 2.8;

providing at least one additional screen cloth parallel to said initial cloth; and calendering said woven wire screen cloth to resist movement between said warp and shute filaments.

10. A woven wire screen cloth assembly having at least a top and a lower aligned screen cloth, wherein said top screen cloth comprises:

a plurality of parallel warp filaments crossed by a plurality of parallel shute filaments, a greater number of said warp filaments than shute filaments per given area;

a plurality of rectangular openings formed from said filaments, each said rectangular opening having a length and a width, wherein the length to width ratio of each said opening is between approximately 2.7 to 2.8; and wherein the length of each said rectangular opening to the diameter of the shute filaments is a ratio of between approximately 5.5 to 5.7; and wherein said screen cloth is calendered to assist in locking said warp filaments with respect to said shute filaments.

11. A woven wire screen cloth assembly as set forth in claim 10 including a perforated metal plate to support said top and said lower screen cloths.

* * * * *